(12) United States Patent
Morenko et al.

(10) Patent No.: US 11,655,921 B2
(45) Date of Patent: May 23, 2023

(54) MULTI-SEAL COUPLING FOR A HYDROGEN FUEL SYSTEM OF A GAS TURBINE ENGINE

(71) Applicant: PRATT & WHITNEY CANADA CORP., Longueuil (CA)

(72) Inventors: Oleg Morenko, Oakville (CA); Sandeep Singh Dhalla, Woodbridge (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 177 days.

(21) Appl. No.: 17/198,445

(22) Filed: Mar. 11, 2021

(65) Prior Publication Data
US 2022/0290613 A1 Sep. 15, 2022

(51) Int. Cl.
  *F16L 19/02* (2006.01)
  *F02C 7/22* (2006.01)
  *F02C 7/28* (2006.01)

(52) U.S. Cl.
  CPC .......... *F16L 19/0212* (2013.01); *F02C 7/222* (2013.01); *F02C 7/28* (2013.01); *F05D 2220/32* (2013.01); *F05D 2240/35* (2013.01); *F05D 2240/55* (2013.01)

(58) Field of Classification Search
  CPC ............... F16L 19/0212; F16L 19/0218; F16L 19/0286; F16L 25/03; F16L 23/162; F16L 23/16; F16L 23/18; F16L 23/20; F16L 23/22; F02C 7/222; F02C 7/28
  See application file for complete search history.

(56) References Cited

U.S. PATENT DOCUMENTS

| 4,239,242 A * | 12/1980 | Burns ................. F16L 19/0218 |
| 5,192,095 A | 3/1993 | Behrens |
| 6,547,255 B1 * | 4/2003 | Donaway ............ F16L 19/0212 |
| 10,883,403 B2 | 1/2021 | Rockey |
| 2005/0179259 A1 * | 8/2005 | Sugiyama ........... F16L 19/0218 |
| 2006/0099843 A1 * | 5/2006 | Fullner ................. F16L 25/023 |
| 2018/0299042 A1 * | 10/2018 | Ishibashi ............. F16L 19/0218 |
| 2020/0025314 A1 * | 1/2020 | Pattison, II ......... F16L 19/0218 |

FOREIGN PATENT DOCUMENTS

| CN | 110242805 | 9/2019 |
| EP | 1947375 | 7/2008 |
| WO | WO-2021100291 A1 * | 5/2021 |
| WO | WO-2021182398 A1 * | 9/2021 |

* cited by examiner

*Primary Examiner* — Zachary T Dragicevich
(74) *Attorney, Agent, or Firm* — Norton Rose Fulbright Canada LLP (57) ABSTRACT

A multi-seal coupling for fluidly interconnecting a first component and a second component within a hydrogen fuel supply system of a gas turbine engine includes a female joint portion and a male joint portion. A first seal, a second seal and a third seal, all of which are hydrogen fuel seals, are formed between the male joint portion and the female joint portion. The first seal is formed by face-to-face abutting contact between a first axially-facing surface of the male joint portion and an axially-facing surface of the female joint portion. The second seal is formed by a gasket axially compressed between the first axially-facing surface of the male joint portion and the female joint portion. The third seal is formed by a sealant ring disposed between a second axially-facing surface of the male joint portion and an adjacent surface of the female joint portion.

20 Claims, 5 Drawing Sheets

MULTI-SEAL COUPLING FOR A HYDROGEN FUEL SYSTEM OF A GAS TURBINE ENGINE

TECHNICAL FIELD

The disclosure relates generally to gas turbine engines and, more particularly, to gas turbine engines which use hydrogen or other alternative fuels.

BACKGROUND

Most gas turbine engines used in aviation applications are designed to be powered by industry-standard petroleum jet fuels, typically kerosene-based fuels such as "Jet A" and "Jet A-1". Despite the prevalence of these kerosene-based fuels for aviation gas turbine engines, alternative fuels remain of interest. Considerations including climate impact have motivated the search for potential alternative fuels, such as hydrogen.

However, using alternative fuels such as hydrogen in typical gas turbine engine fuel systems can pose certain design/engineering challenges which are not encountered when jet fuels are used. For example, certain alternative fuels, including hydrogen, can be gaseous at atmospheric conditions and thus may need to be stored and/or conveyed in gaseous form. In gaseous form, hydrogen is an extremely small molecule in comparison with standard petroleum-based jet fuels, which makes achieving adequate sealing in fuel systems carrying hydrogen gas more challenging than for standard gas turbine engine fuel systems designed to carry liquid jet fuel.

SUMMARY

A triple seal interface for a fuel system of a gas turbine engine is described herein that has at least two independent failure modes, and which is particularly adapted to handle hydrogen or other alternative fuel (i.e. non-kerosene based Jet-A or Jet-A1).

In one aspect, there is provided a multi-seal coupling for fluidly interconnecting a first component and a second component within a hydrogen fuel supply system of a gas turbine engine, the multi-seal coupling comprising: a female joint portion adapted to be connected to the first component and a male joint portion adapted to be connected to the second component, the male joint portion received within the female joint portion in mating engagement along a longitudinal axis to form a hydrogen-sealed fuel flow passage through the multi-seal coupling; and a first seal, a second seal and a third seal formed between the male joint portion and the female joint portion, the first, second and third seals being hydrogen fuel seals, and wherein: the first seal is formed by face-to-face abutting contact between a first axially-facing surface of the male joint portion and an axially-facing surface of the female joint portion; the second seal is formed by a gasket axially compressed between the first axially-facing surface of the male joint portion and the female joint portion; and the third seal is formed by a sealant ring disposed between a second axially-facing surface of the male joint portion and an adjacent surface of the female joint portion.

The multi-seal coupling as described above and herein may further include, in whole or in part, and in any combination, one or more of the following additional features.

In certain embodiments, a planar interface is defined at the first axially-facing surface of the male joint portion, at least the first seal and the second seal defining axial seals at said planar interface.

In certain embodiments, at least two of the first, second and third seals are located on axially opposite sides of the planar interface.

In certain embodiments, the first seal is located radially outward from the hydrogen-sealed fuel flow passage, and the second seal is located radially outward of the first seal.

In certain embodiments, the female joint portion has an outer flange within which an outer tip of the male joint portion is received, the outer tip of the male joint portion having the first axially-facing front face of the first seal.

In certain embodiments, the female joint portion has an inner flange located radially inwardly from the outer flange, the inner flange circumscribing the hydrogen-sealed fuel flow passage and defining the axially-facing surface of the female joint portion.

In certain embodiments, the outer flange is axially offset and radially offset from the inner flange.

In certain embodiments, the gasket of the second seal is radially disposed between the inner flange and the outer flange of the female joint portion.

In certain embodiments, the gasket of the second seal is received within a cavity defined in the female joint portion radially outward from the inner flange and radially inward of the outer flange, the gasket having an uncompressed axial dimension that is greater than an axial depth of the cavity.

In certain embodiments, the second axially-facing surface of the male joint portion at the third seal faces an axial direction that is opposite that of the first axially-facing surface.

In certain embodiments, the sealant ring of the third seal is axially spaced apart from the first axially-facing surface of the male joint portion.

In certain embodiments, the sealant ring of the third seal is located radially outward of at least the first seal.

In certain embodiments, the sealant ring of the third seal is located radially outward a majority of the gasket of the second seal.

In certain embodiments, the adjacent surface at the third seal is a radially inwardly facing circumferential surface of the outer flange on the female joint portion.

In certain embodiments, the outer flange of the female joint portion extends axially further towards the male joint portion than does the inner flange of the female joint portion.

In certain embodiments, an outer locking nut is located radially outward from and surrounding both the male joint portion and the female joint portion, the outer locking nut being threadedly engaged with one of the female joint portion and the male joint portion to generate an axial force towards each other and thereby axially secure the female joint portion and the male joint portion together.

In another aspect, there is provided a multi-seal coupling for fluidly interconnecting a first component and a second component within a hydrogen fuel supply system of a gas turbine engine, the multi-seal coupling comprising: a female joint portion adapted to be connected to the first component, the female joint portion defining a first fuel flow passage therethrough, the female joint portion having an inner flange circumscribing the first fuel flow passage and an outer flange radially spaced apart from the inner flange; a male joint portion adapted to be connected to the second component, the male joint portion defining a second fuel flow passage therethrough, the male joint portion received within the female joint portion in mating engagement with the second fuel flow passage in fluid flow communication with the first fuel flow passage, the male joint portion including an outer tip received within the outer flange of the female joint portion, the outer tip having an axially-facing front face; a first seal between the male joint portion and the female joint portion, the first seal formed by face-to-face contact at a planar interface between the axial front face of the outer tip on the male joint portion and the inner flange on the female joint portion, the first seal located radially outward from the first and second fuel flow passages; a second seal between the male joint portion and the female joint portion, the second seal forming a face seal and including a gasket, the gasket being axially compressed between the axial front face of the outer tip on the male joint portion and the female joint portion at said planar interface, the second seal being located radially outward of the first seal; and a third seal between the male joint portion and the female joint portion, the third seal including a sealant ring that is axially spaced apart form the planar interface and located radially outward of at least the first seal, the third seal being disposed between an axial rear face of the outer tip of the male joint portion and a radially inwardly facing circumferential surface of the outer flange on the female joint portion.

In a further aspect, there is provided a gas turbine engine at least partially powered by hydrogen fuel, the gas turbine engine comprising: a compressor, a combustor and a turbine; a hydrogen fuel supply system, comprising: an external fuel manifold disposed outside a casing surrounding the annular combustor and being fastened thereto; fuel nozzles circumferentially distributed about the combustor for injecting the hydrogen fuel therein, radially outer ends of the fuel nozzles being fastened to the casing and axially spaced apart from the external fuel manifold; fuel supply tubes disposed outside the casing and fluidly interconnecting the radially outer ends of the fuel nozzles and the fuel manifold; and multi-seal couplings fluidly interconnecting the fuel supply tubes with one or both of the fuel manifold and the fuel nozzles, the multi-seal couplings including: a female joint portion adapted to be connected to the first component and a male joint portion adapted to be connected to the second component, the male joint portion received within the female joint portion in mating engagement along a longitudinal axis to form a hydrogen-sealed fuel flow passage through the multi-seal coupling; and a first seal, a second seal and a third seal formed between the male joint portion and the female joint portion, the first, second and third seals being hydrogen fuel seals, and wherein: the first seal is formed by face-to-face abutting contact between a first axially-facing surface of the male joint portion and an axially-facing surface of the female joint portion; the second seal is formed by a gasket axially compressed between the first axially-facing surface of the male joint portion and the female joint portion; and the third seal is formed by a sealant ring disposed between a second axially-facing surface of the male joint portion and an adjacent surface of the female joint portion.

The gas turbine engine and/ or fuel system as described above and herein may further include, in whole or in part, and in any combination, one or more of the following additional features.

In certain embodiments, a planar interface is defined at the first axially-facing surface of the male joint portion, at least the first seal and the second seal defining axial seals at said planar interface.

In certain embodiments, at least two of the first, second and third seals are located on axially opposite sides of the planar interface.

BRIEF DESCRIPTION OF THE DRAWINGS

Reference is now made to the accompanying figures in which.

DETAILED DESCRIPTION

Figure 1:
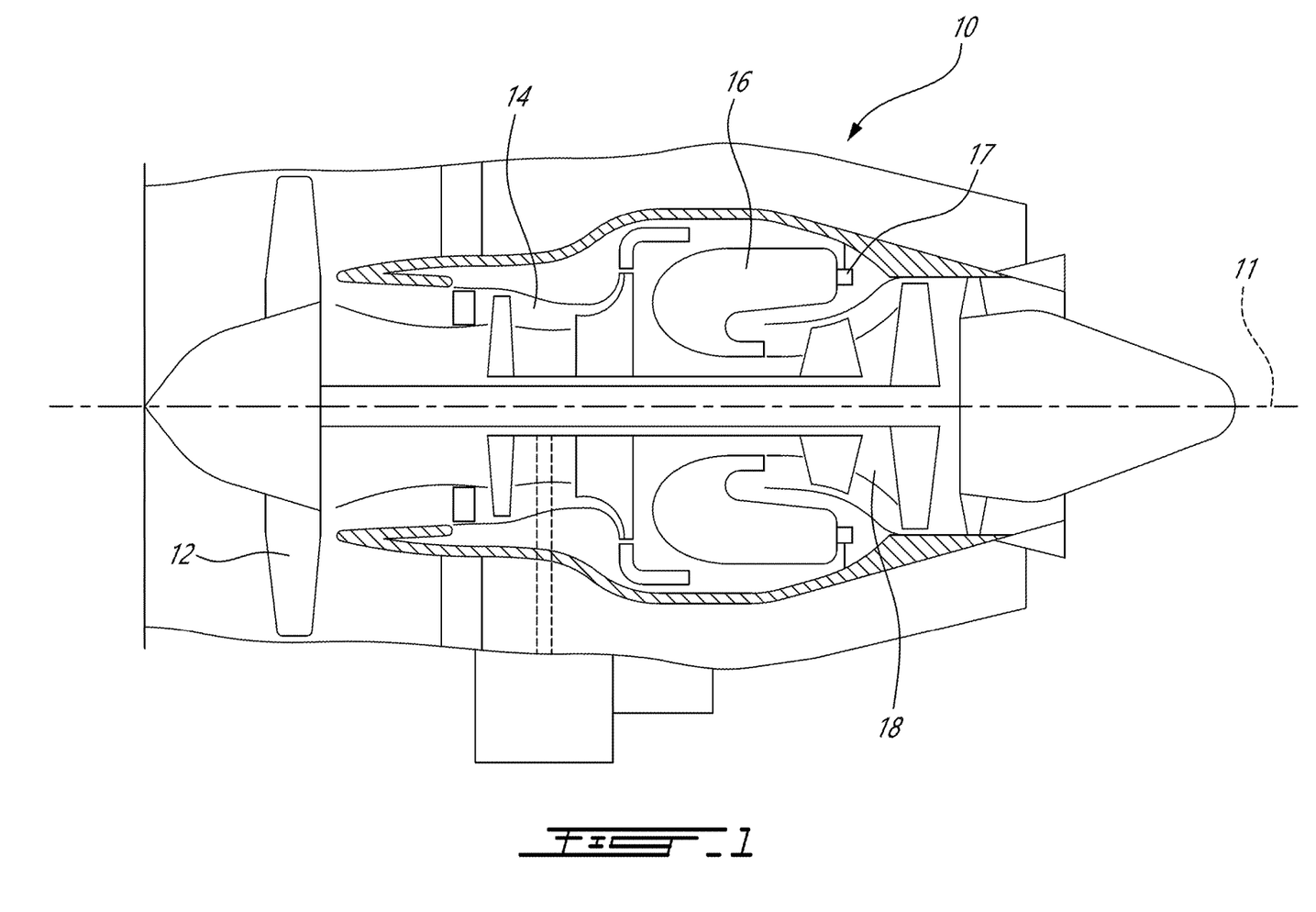
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Although a turbofan engine 10 is shown in FIG. 1 for exemplary purposes, it is to be understood that the gas turbine engine 10 as described and claimed herein may alternately be another type of gas turbine engine, including for example turboshafts and turboprops. A longitudinal main engine axis 11 extends through the center of the engine 10. Unless indicated otherwise, the terms "longitudinal" and "circumferential" as used herein are intended to define directions relative to this main engine axis 11.

Most gas turbine engines, including turbofan, turboprop, turboshaft, and hybrid powered engines such as hybrid-electric turbine engines, typically include fuel systems designed to run exclusively on kerosene-based fuels such as "Jet A" and "Jet A-1" fuel. Certain challenges exist when such engines are designed, or retrofitted, such as to powered by alternative fuels, such as hydrogen or natural gas for example. One challenge when using alternative fuels in these engines, especially if such alternative fuels may be conveyed within the fuel system of the engine in a gaseous state, is that the fuel systems are designed with liquid jet fuel in mind. However, the seals needed to provide adequate sealing of an alternative fuel, such as hydrogen, are quite different than seals designed to prevent leakage of liquid jet fuel. Or in other words, standard liquid fuel seals currently used in existing gas turbine engine fuels may not be adequate to seal an alternative fuel, such as hydrogen, whether it is gaseous or not gaseous The fuel system as described herein is intended to be used in a gas turbine engine that is at least partially powered by an alternate fuel (i.e. not a kerosene-based jet fuel), such as hydrogen. However, it is to be understood that the fuel system and the gas turbine engine having same as described herein may also be a hybrid or bi-fuel system, in which two different fuel types (e.g. an alternative fuel such as hydrogen, as well as a traditional jet fuel) may be used. In such hybrid or dual fuel systems, either the fuel system may be designed with a capability to hold and convey both a jet fuel and an alternative fuel, or the fuel system is designed with a capability to selectively hold a jet fuel or an alternative fuel. As such, it is possible for the fuel system to include, for example, two distinct fuel flow systems, each intended to convey a different fuel type. There may therefore be, for example, a standard fuel manifold feeding fuel nozzles configured for injecting standard jet fuel into the combustion chamber of the engine, as well as a separate hydrogen or alternate fuel manifold that is configured to convey the alternate fuel to another set of fuel nozzles configured for injecting the hydrogen or the alternate fuel into the combustion chamber of the engine.

Although hydrogen is discussed primarily below as the fuel source of the described alternative fuel system, it is to be understood that other alternative fuels (i.e. not kerosene based Jet-A or Jet-A1 fuels) may also be used in conjunction with the present fuel system and its components, including in particular the multi-seal couplings 50.

Accordingly, the present disclosure is directed to a fuel system for a gas turbine engine that includes at least an alternative (e.g. hydrogen) fuel source, but may also include one or more additional fuel sources and thus may have multiple distinct fuel paths or fuel sub-subsystems. In various embodiments, one or two fuel sources may be utilized, at least one being a gaseous fuel such as hydrogen and the other, if present, being a liquid fuel such as kerosene or jet fuel. Other numbers and types of fuels may be contemplated as well.

Figure 2:
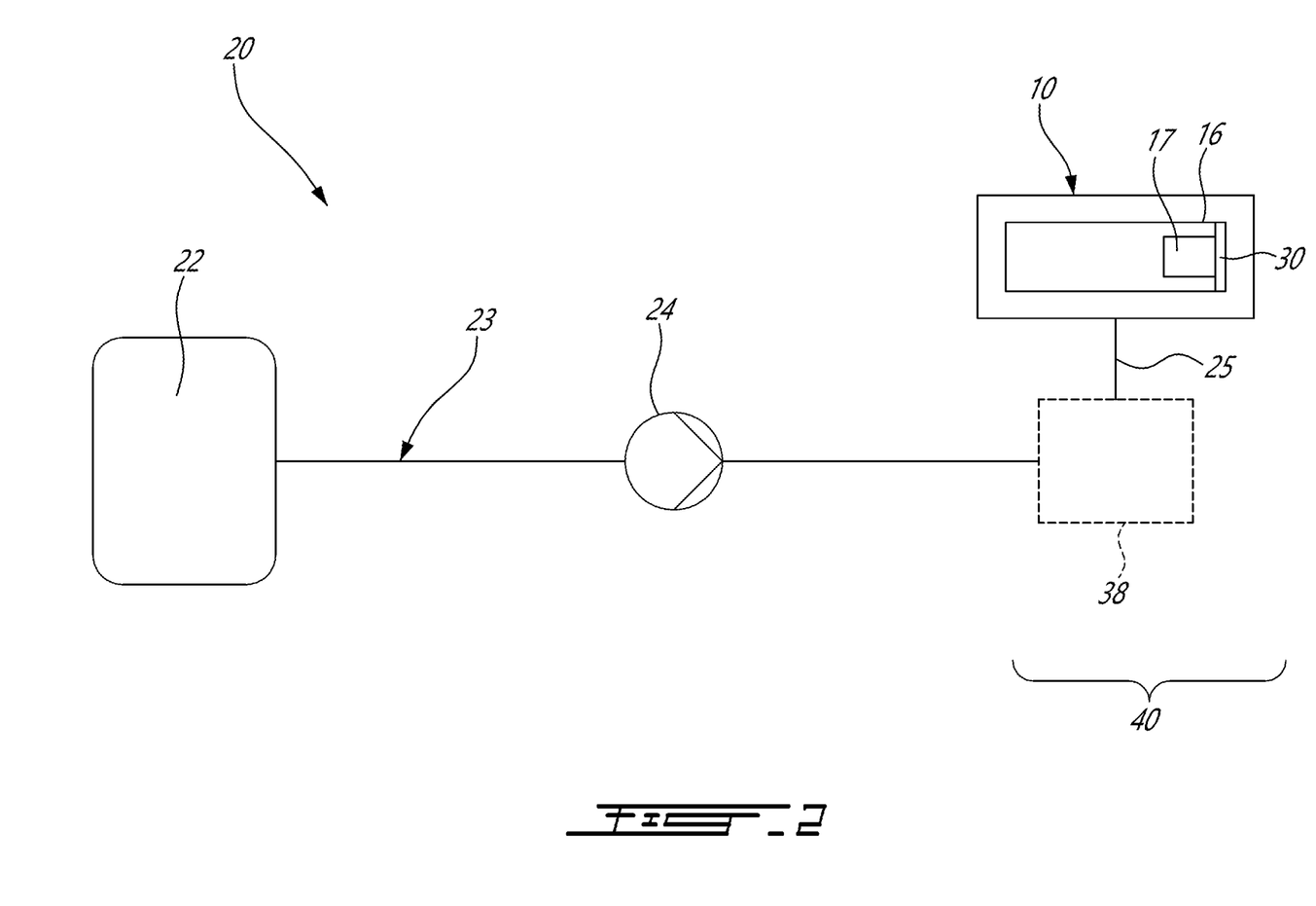
FIG. 2 is a schematic fluid circuit diagram of a fuel system of the gas turbine engine of FIG. 1.

Referring now to FIG. 2, an aircraft fuel system 20 in accordance with one aspect of the present disclosure is schematically depicted. The fuel system 20 may be described herein as a hydrogen fuel system, but it is to be understood that it can also be used for other alternative fuels which, in comparison with traditional jet fuels, may include gaseous-based fuels.

The fuel system 20 is operable to feed hydrogen fuel from a fuel tank 22, which in this case is a hydrogen storage tank, located within the aircraft to the gas turbine engine 10 for injection into the combustor 16 thereof via fuel nozzles 17, which are operable to inject the hydrogen fuel into the combustor 16 for combustion. In an alternate embodiment, two or more fuel tanks 22 may also be provided, at least one of which is used to store the hydrogen fuel. In the case of a hybrid fuel system, one fuel tank 22 may be used to store the hydrogen fuel while another, separate, fuel tank may be used to store regular jet fuel. Regardless, the fuel system 20 includes at least one fuel tank 22 which stores hydrogen fuel, which may for example be in gaseous or partially gaseous form.

In operation, fuel is pumped, drawn or ejected out from a fuel tank 22, such as by one or more fuel pumps 24, and into a main fuel line 23 of the fuel system 20 before being fed to the one or more gas turbine engines 10 of the aircraft. Accordingly, a portion of the fuel system 20 will be located within the aircraft (e.g. fuel tank(s) 22, main fuel line 23, fuel pump(s) 24, etc.), and another portion of the fuel system exists within and forms part of the gas turbine engine(s) 10. For the purposes of this disclosure, the portion of the overall fuel system 20 that is part of the gas turbine engine 10 will be referred to as the hydrogen fuel supply system 40 of the engine 10. The hydrogen fuel supply system 40 accordingly forms part of the engine 10 itself, but in operation acts integer with the rest of the fuel system 20 of the aircraft to distribute fuel to the engine(s) 10 for propulsion of the aircraft.

Although the fuel system 20 is depicted in FIG. 2 as having a single fuel pump 24 for schematically representative reasons, it is to be understood that more than one pump may be used. In fact, it is common in fuel systems to use several pumps, which may be of different types (ejector, centrifugal, gear etc.) and have different pressures (low pressure, high pressure) for example, as may be required. For example, one pump may be a low pressure pump which provides a relatively small increase in pressure to the fuel but displaces large volumes of fuel though the main fuel line 23 of the fuel system 20. A high pressure pump may also be provided, which for example increases the pressure of the fuel in a substantial manner relative to the low pressure pump, so that the fuel may later be ejected into the combustor of the engine. One example of such a high pressure pump is a gear pump, however any suitable type of pump which produces a high pressure output may be used. Regardless of the number of fuel pumps used, they are selected such as to be capable of pumping hydrogen fuel, which for example may require pumping primarily gaseous fuel though he main fuel line 23. In one particular embodiment the pump(s) 24 are located in-line within the main fuel line 23, at some point downstream of the fuel tank 22, between the fuel tank 22 and the combustor 16. In an alternate embodiment, however, one or more pumps may also be located directly within the fuel tank 22.

The hydrogen fuel supply system 40 of the fuel system 20 is accordingly operable, in use, to receive the hydrogen fuel from the main fuel line 23 of the aircraft for distribution to the fuel nozzles 17 of the gas turbine engine 10. The hydrogen fuel supply system 40 includes at least a fuel manifold 30 for this purpose, which is in communication with fuel nozzles 17 to distribute the hydrogen fuel to the fuel nozzles and thus the combustor 16 of the engine 10.

The hydrogen fuel supply system 40 may also include, in certain embodiments, a Fuel Control Unit/Fuel Metering Unit (FMU) 38 which is used to control and/or modulate the volume and/or pressure of the fuel delivered to the combustor 16. Although not shown for ease of explanation and due to the simplified schematic nature of FIG. 2, the fuel system 20 and/or the hydrogen fuel supply system 40 may also include filter(s), heat exchanger(s) and/or other suitable fuel system components necessary for the gas turbine engine 10 and/or the aircraft, as will be known and appreciated by one skilled in the art.

Figure 3:
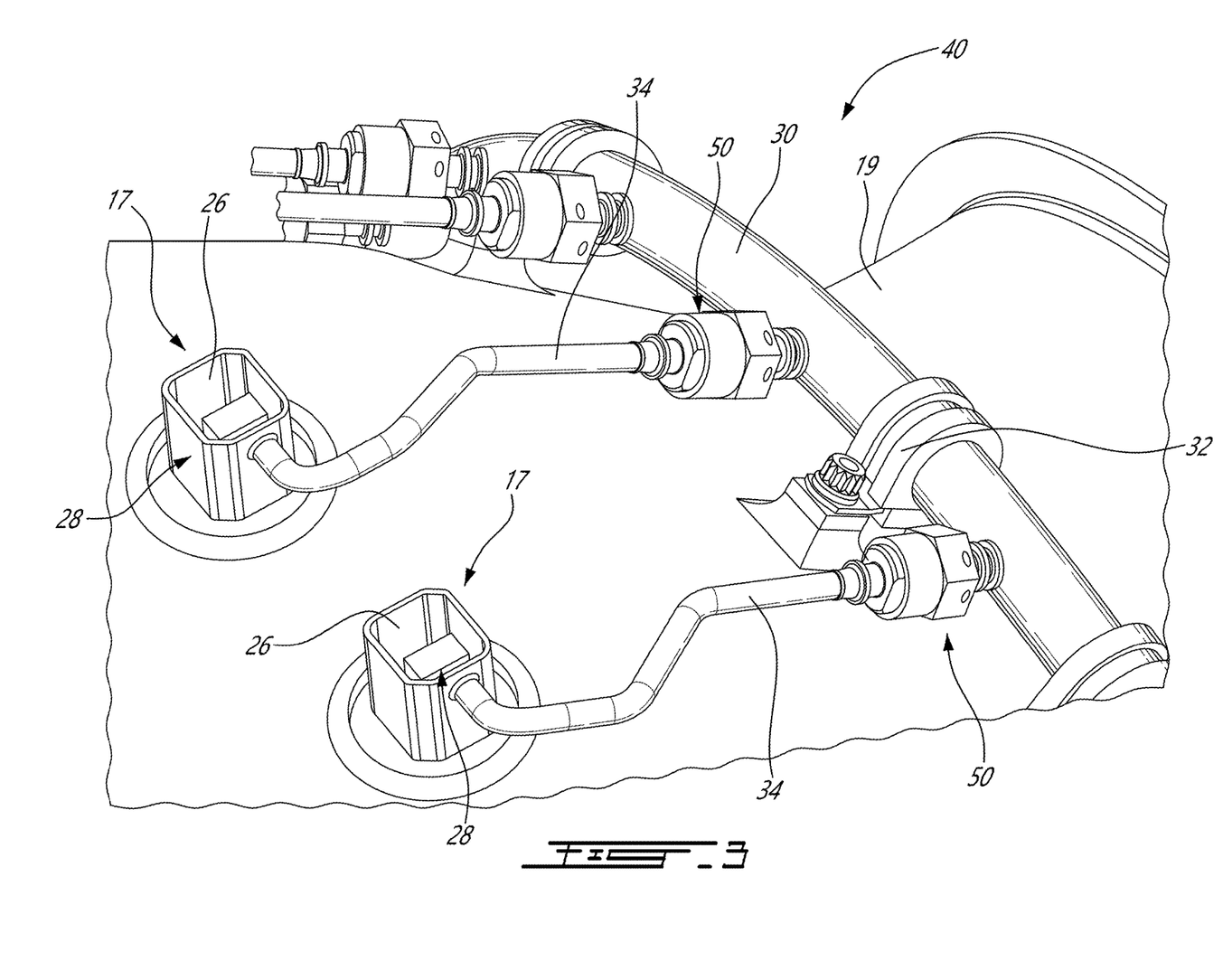
FIG. 3 is a three-dimensional view of a portion of the fuel system of FIG. 2.

Referring now to FIG. 3, the fuel manifold 30 of the hydrogen fuel supply system 40 of the present fuel system 20 will now be described in further detail.

The fuel manifold 30 in accordance with this embodiment is an external fuel manifold, which is disposed outside, i.e. external to, a casing 19 surrounding the combustor 16 of the gas turbine engine 10. In an alternate embodiment, however the fuel manifold may be an internal fuel manifold that is mounted inside the casing 19, outside of the combustor. The fuel manifold 30 is located radially outwardly to the combustor case 19 relative to the central axis 11 of the engine. This portion of the casing 19 is sometimes referred to as the "gas gen" or "gas generator" case. The external fuel manifold 30 is fixed in place on the casing 19 by bolted clamps 32 or other suitable engagement fasteners.

The fuel manifold 30 may comprise a number of components that together make up its fuel-circulation network feeding the fuel nozzles 17, and is generally annular (either fully annular or partially annular—e.g. it may include two or more arcuate portions which, while circumferentially interrupted, still form a generally circumferential and/or annular manifold assembly). Regardless of its configuration, the fuel manifold 30 therefore extends generally circumferentially about the exterior of the casing 19 and thus surrounds the annual combustor 16 therewithin. Fuel is therefore distributed to each of the fuel nozzles 17 by the external fuel manifold 30. The fuel manifold 30 receives fuel therein from the final fuel supply line 25, as shown in FIG. 2. The fuel manifold 30 accordingly helps to distribute the fuel received from the fuel source (e.g., the fuel tank 22, via the main fuel line 23 and the final fuel supply line 25) to the plurality of fuel nozzles 17. The fuel manifold 30 therefore circumferentially circulates the fuel, in this case hydrogen fuel, to the fuel nozzles 17 which are circumferentially spaced apart about the manifold 30 and about the combustor 16.

Each fuel nozzle 17, which is in fact an assembly of several components, includes an outer nozzle head 28 which is located outside of the casing 19 and forms the radially outer end of the fuel nozzle 17, a nozzle tip (not shown) located at a radially inner end of the fuel nozzle 17 and which projects into the combustor to inject the fuel into the combustion chamber within the combustor, and a nozzle stem (not shown) connecting the nozzle head 28 to the nozzle tip. Further features of the fuel nozzles 17 will not be described in further detail as they will be well understood by those skilled in the art.

The radially outer nozzle head 28 of each fuel nozzle 17 may also include suitable retainer members 26 which may be separate from the fuel nozzle itself (i.e. the two parts are not integrally formed but are fastened together). However, in other embodiments, the retainer members 26 may be integrally formed with the nozzle heads 28 and/or the nozzle stems of the fuel nozzles 17, wherein the retainer members 26 form an integral nozzle head which is located outside of the casing 19 for engagement with the fuel manifold 30, via the transfer tubes 34 as will be seen. However, in certain embodiments where no transfer tubes 34 are required, the retainer members 26 and/or the nozzle heads 28 of the fuel nozzles 17 may be engaged directly, i.e. without transfer tubes, with the fuel manifold 30 outside of the casing 19.

As can be seen in FIG. 3, in certain embodiments the nozzle head 28 of each fuel nozzle 17 is axially spaced apart from the fuel manifold 30, and therefore each fuel nozzle 17 is connected in flow communication with the fuel manifold 30 via a respective fuel transfer tube 34. The fuel transfer tubes 34, which may also be referred to as "jumper" tubes, convey fuel from the annular fuel manifold 30 to the respective fuel nozzles 17 for subsequent injection to the combustor 16.

As will be described in further detail below with reference to FIGS. 4 and 5, the hydrogen fuel supply system 40 of the fuel system 20 includes multi-seal couplings 50, which form detachable, hydrogen-sealing joints between at least two components of the hydrogen fuel supply system 40.

The multi-seal couplings 50 form a hydrogen-sealing joint, i.e. a fluid joint capable of sealing hydrogen fuel—including in a gaseous state—and not just liquid fluid as per most typical fuel joints. The multi-seal couplings 50 may be used between any two components of the hydrogen fuel supply system 40 that are connected together in fuel flow communication. For example, two components interconnected by the multi-seal couplings 50 may be the transfer tubes 34 and the fuel manifold 30, as shown in FIG. 3, or alternately may be the transfer tubes 34 and the nozzle heads 28 of the fuel nozzles 17, or alternately still may be two other components elsewhere in the hydrogen fuel supply system 40 of the gas turbine engine. In a further embodiment, the multi-seal couplings 50 may also be used to fluidly interconnect two other components within the larger fuel 20, wither within the gas turbine engine 10 or within the aircraft. Therefore although the multi-seal couplings 50 are depicted in the exemplary embodiment of FIG. 3 as only being located between the fuel manifold 30 and the fuel transfer tubes 34, it is to be understood that the multi-seal couplings 50 of the present disclosure may be used elsewhere in the fuel system 20 and/or elsewhere in the gas turbine engine 10, including but not limited to the other end of the fuel transfer tubes 34 (i.e. at the joints between the fuel transfer tubes 34 and the nozzle heads 28 of the fuel nozzles 17).

In the embodiment of FIG. 3, each of the fuel transfer tubes 34 is connected to the fuel manifold 30 by a multi-seal coupling 50, which are also therefore external to the combustor casing 19. The multi-seal couplings 50 are detachable, in that they permit the fuel transfer tubes 34 to be removably fastened to the manifold 30 while still adequately sealing the joint (preventing hydrogen fuel leakage) and permitting fluid flow communication between the two components, namely the manifold 30 and the fuel transfer tubes 34. These multi-seal couplings 50 will be described in further detail below.

Figure 4:
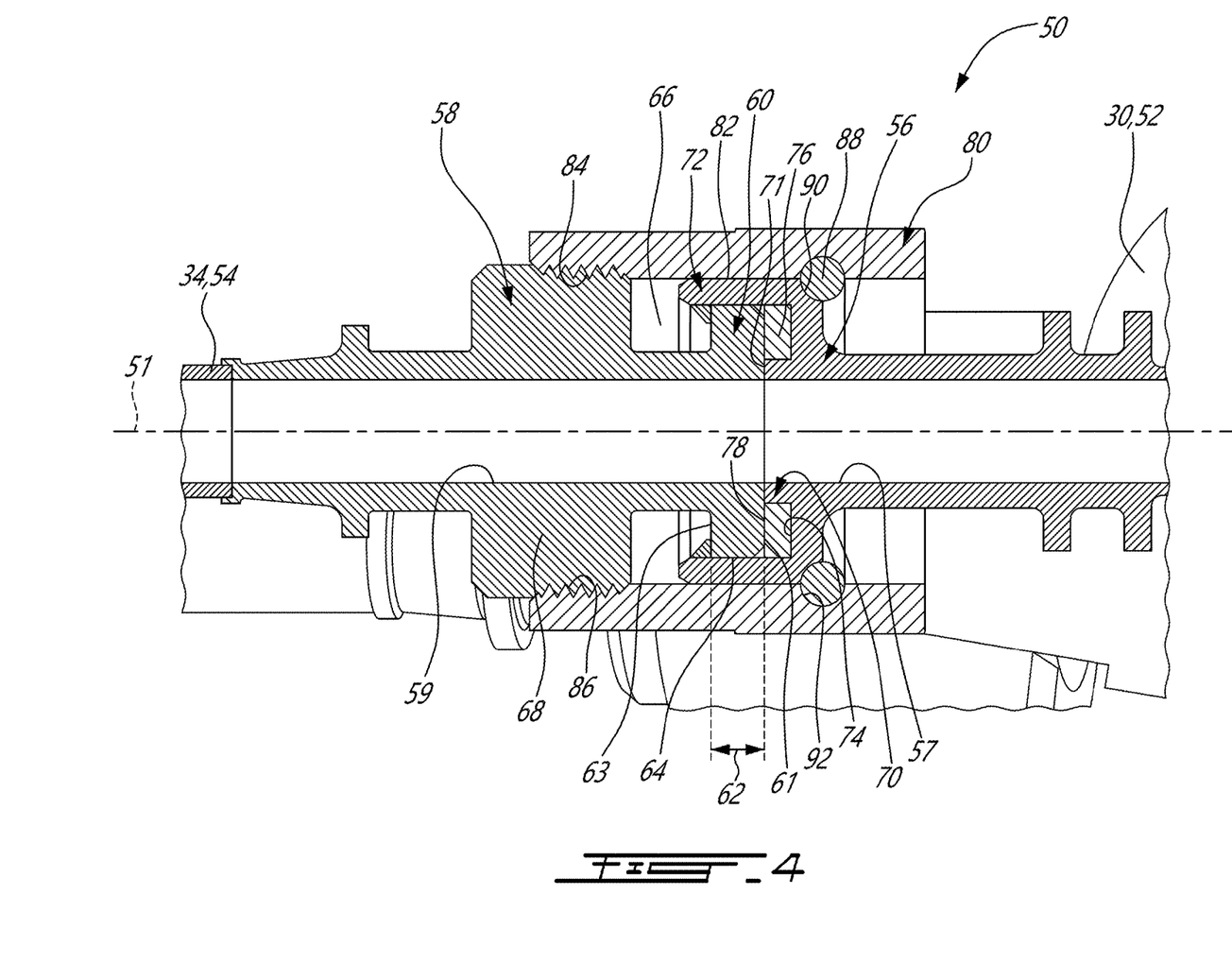
FIG. 4 is a cross-sectional view of a multi-seal coupling forming a joint between two components of the fuel system of FIG. 3.

Referring now to FIG. 4, the multi-seal couplings 50 is specifically designed and configured for preventing leakage of hydrogen fuel or other similar alternative and/or gaseous fuels. As noted above, hydrogen is an extremely small molecule in comparison with the molecules of standard petroleum-based liquid jet fuels. Accordingly, any seals and/or connections within a hydrogen fuel system, such as the present fuel system 20, need to be able to adequately seal the hydrogen fuel so as to prevent and/or limit fuel loss. It has been found that in some cases, certain sealed joints originally designed for liquid jet fuel applications may not provide sufficient sealing to be able to adequately seal a hydrogen system. With this context in mind, the multi-seal couplings 50 of the hydrogen fuel supply system 40 of the fuel system 20 has a configuration which seeks to provide improved sealing performance in comparison with traditional sealed joints used in the liquid jet fuel systems of gas turbine fuel systems.

More particularly, the multi-seal couplings 50 comprise a triple seal interface, as will be further described, and includes several independent failure modes. The resulting fluid seal provided by the multi-seal couplings 50 will accordingly permit its use within a hydrogen fuel system 20, by preventing and/or substantially limiting hydrogen gas leakage out of the sealed connection. While the present triple seal interface is described in this embodiment as part of the multi-seal couplings 50, it is to be understood that variations in terms of a number of sealing interfaces and/or number of independent failure modes may alternately be possible.

Referring still to FIG. 4, the multi-seal coupling 50 is used for fluidly interconnecting a first component 52 and a second component 54 of the hydrogen fuel supply system 40 of the gas turbine engine 10. As noted above, in a particular embodiment, the first component 52 may include the fuel manifold 30 and the second component 54 may include a fuel transfer tube 34. Regardless, the multi-seal coupling 50 itself includes a female joint portion 56 and a male joint portion 58, which are matingly engaged when the multi-seal coupling 50 is closed (as shown in FIG. 4) such as to permit fluid flow communication between a first fuel flow passage 57 and a second fuel flow passage 59 that respectively extend through the female joint portion 56 and the male joint portion 58.

In certain embodiments, the first fuel flow passage 57 of the female joint portion 56 and the second fuel flow passage 59 of the male joint portion 58 are disposed centrally within each component of the multi-seal coupling 50, such that they are aligned and co-axial with a centrally disposed and longitudinally extending axis 51 of the multi-seal coupling 50. Alternately, however, provided that the first fuel flow passage 57 and the second fuel flow passage 59 are disposed in fluid flow communication when the joint is formed by the multi-seal coupling 50, these fuel passages need not necessary by coaxially aligned, nor of the same size/diameter, etc.

With reference to the multi-seal coupling 50, faces and/or components will be described with reference to their direction and/or orientation relative to the longitudinal axis 51. It will therefore be understood that the terms "axial" and "radial" as used herein with reference to components of the multi-seal coupling 50 are intended to define directions relative to this local longitudinal axis 51 of the multi-seal coupling 50 as shown in FIG. 4 (and not the main engine axis 11 of FIG. 1).

The mating engagement between the components of the multi-seal coupling 50 is such that multiple sealing points are provided. In the depicted embodiment, three distinct sealing points—that is, three distinct seals between engaged surfaces of the cooperating female and male joint portions 56, 58 are provided. These multiple sealing points also provide multiple (e.g. two or more) different failure modes, as will be seen.

Before explaining these multiple sealing points, the relative configuration of the female joint portion 56 and the male joint portion 58 of the multi-seal coupling 50 will first be described in detail, such as to better understand how their relative shapes and configurations fit together to create the multiple seals.

Referring still to FIG. 4, the male joint portion 58 includes an outer tip 60 having an axially-facing front face 61 (hereinafter, simply axial front face 61) that forms the axially outmost surface of the male joint portion 58 and that circumscribes the opening to the second fuel flow passage 59. The axial front face 61 of the outer tip 60 faces in an axial direction away from the male joint portion 58 (i.e. towards the female joint portion 56). The outer tip 60 of the male joint portion 58 has an axial rear face 63 that is axially spaced apart from the axial front face 61 by a radially outer surface 64 such as to define an axial thickness 62 of the outer tip 60. As can be seen in FIG. 4, a void 66 is defined behind the axial rear face 63 of the male joint portion 58. This void 66 extends an axial length between the axial rear face 63 of the outer tip 60 and a threaded body 68 located towards the axial end of the male joint portion 58 that is coupled to the second component 54.

The female joint portion 56 includes an inner flange 70 that circumscribes the opening to the first fuel flow passage 57. This inner flange 70 defines an axial front face 71 that faces in an axial direction away from the female joint portion 56 (i.e. towards the male joint portion 58). The axial front face 71 of the inner flange 70 on the female joint portion 56 faces towards (and abuts, as will be noted below) the axial the axial front face 61 of the outer tip 60 of the male joint portion 58.

The female joint portion 56 also includes an outer flange 72 that is radially spaced apart form the inner flange 70 and that extends axially further towards the male joint portion 58 than does the inner flange 70. As such, the outer flange 72 is both radially and axially offset from the inner flange 70. A cavity 74 is formed within the female joint portion 56, radially outward from the inner flange 70 and radially inward of the outer flange 72. The cavity 74 receives therein a gasket 76 that is axially compressed and retained within the cavity 74. The gasket 76 includes an axially facing surface 78 that faces toward the axial front face 61 of the outer tip 60 of the male joint portion 58. The gasket may be a metal gasket or an elastomeric gasket, but in either case it has an uncompressed axial dimension that is greater than an axial depth of the cavity 74, such that the gasket is axially compressed when the joint is sealed tight by the connector 50. The gasket 76 is chosen such that it is made of a material that is suitable for sealing hydrogen and/or other gaseous alternative fuels.

Further, as seen in FIG. 4, both the multi-seal coupling 50 also includes, radially outward from and surrounding both the female joint portion 56 and the male joint portion 58, an outer locking nut 80. The outer locking nut 80 is axially slidable on the radial outer circumferential surface 82 of the outer flange 72 of the female joint portion 56. Once the male joint portion 58 has been matingly engaged within the female joint portion 56, the outer locking nut 80 can be slid axially towards the male joint portion (i.e. toward the left in the image of FIG. 4), such that inner threads 84 of the locking nut 80 can threadedly engage the corresponding outer threads 86 on the threaded body 68 of the male joint portion 58. Once the outer locking nut 80 is thus threadedly engaged to threaded body 68 of the male joint portion 58, the nut is fastened in place using a locking thrust wire 80, which is a ring or partial ring that fits within corresponding shaped groves 90 and 92, in the outer flange 72 of the female joint portion 56 and an inner surface of the locking nut 80. The locking thrust wire ring 88 accordingly acts to prevent unwanted axially displacement of the outer locking nut 80 relative to the rest of the multi-seal coupling 50. As such, the outer locking nut 80 cannot accidentally loosen due to vibrations, etc. during operation of the engine.

A main function of the outer locking nut 80 is therefore to secure the two portions of the multi-seal coupling together, namely by generating an axially-directed retention force between the two portions such that they remains tightly mated. However, the threaded connection between the outer locking nut 80 and the threaded body 68 of the male joint portion 58, on one axial end, and the abutting contact between the outer locking nut 80, the locking thrust wire 88, and a rear end of the outer flange 72 of the female joint portion 56, on the other axial end, may also further contribute to the sealing abilities of the multi-seal coupling 50.

Having now described the individual features of the multi-seal coupling 50, its multiple sealing points will now be described in further detail, with particular reference to FIG. 5.

The multi-seal coupling 50 in accordance with certain embodiments of the present disclosure provides at least three different seals (i.e. sealing points) within the one coupling, each having a different and independent seal type and thus a different and independent failure mode. Accordingly, should any one of these seals fail, either partially or fully, the remaining seals within the multi-seal coupling 50 will ensure that little to no hydrogen fuel can leak out of the joint between the components 52, 54 of the hydrogen fuel supply system 40.

Figure 5:
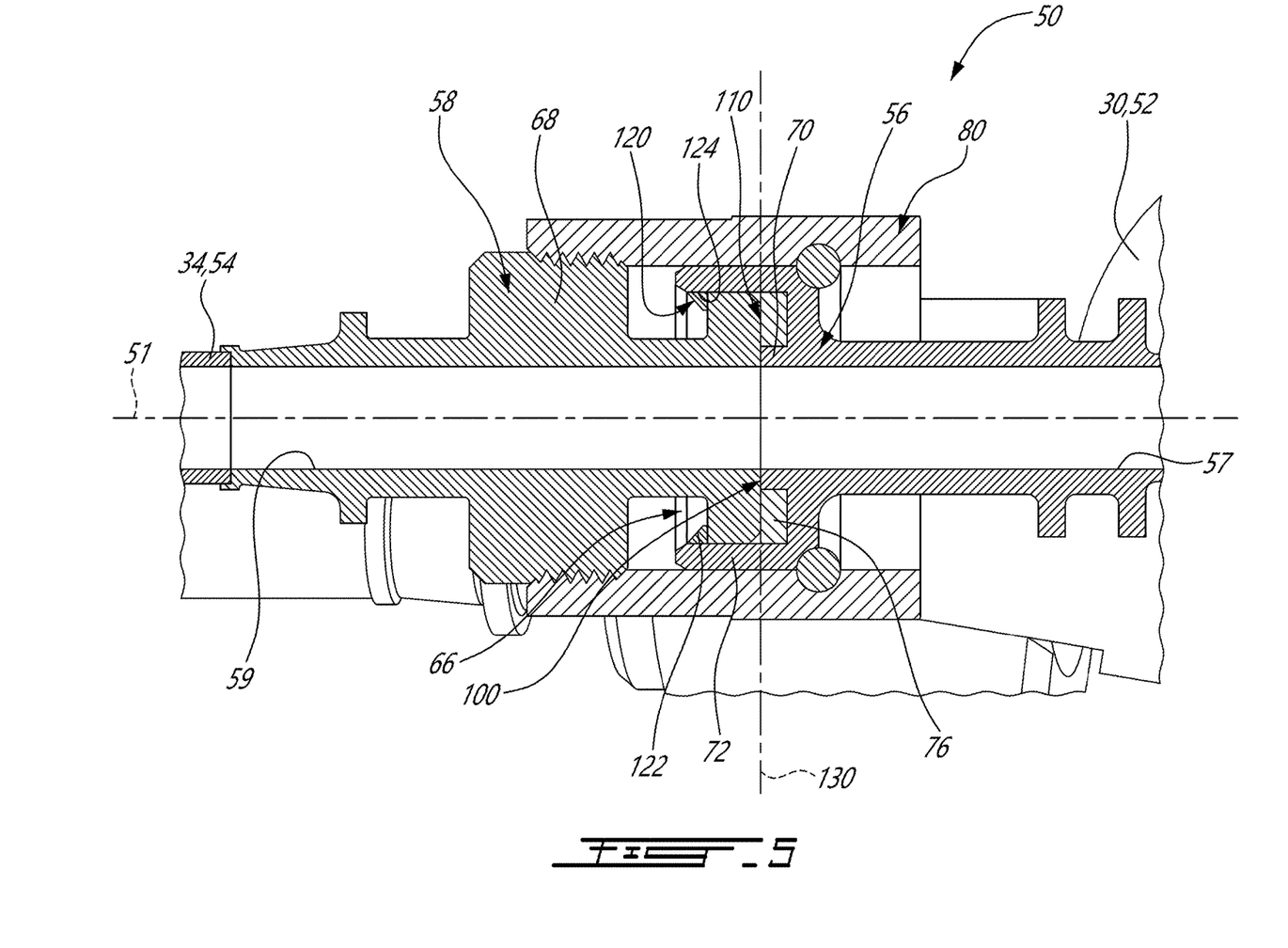
FIG. 5 is another cross-sectional view of the multi-seal coupling of FIG. 4.

With reference to FIG. 5, the multi-seal coupling 50 in accordance with the depicted embodiment includes at least three distinct sealing points (hereinafter simply "seals"), namely seals 100, 110 and 120, which are provided within the multi-seal coupling itself. These three distinct seals 100, 110 and 120 within the multi-seal coupling 50 are, in certain embodiments, axial seals—in that they all form a seal which acts primarily to create a seal between at least one axially-facing surfaces and an adjacent surface (one on each of the male joint portion 58 and the female joint portion 56). In the depicted embodiment, two of the three seals, namely seals 100 and 110, are formed between two axially facing and abutting surfaces, one on each of the joint portions. Thus the seals 100, 110 and 120 of the multi-seal coupling 50 are said to be "axial" seals, in that they may primarily act axially. As such, the multi-seal coupling 50 may be less prone to leaking due to any radial and/or concentricity mismatches between the male joint portion 58 and the female joint portion 56, and thus between the respective the second component 54 and the first component 52, respectively. The multi-seal coupling 50 may therefore accommodate some angular and/or radial misalignment between the components that are fluidly connected by the multi-seal coupling, while still ensuring an adequate seal. This is not true, for comparison purposes, with standard O-ring seals which are commonly employed in sealed joints in certain fuel systems.

The seals 100, 110 and 120 of the multi-seal coupling 50 are also configured and chosen such that the multi-seal coupling 50 has several different, independent, failure modes. In a particular embodiment, such as the multi-seal coupling 50 of FIGS. 4 and 5, each of the three seals 100, 110 and 120 has a different failure mode, such that the multi-seal coupling 50 has three distinct failure modes. For example, seal 100 may caused to fail due to a misalignment between flat faces, uneven "flatness", and/or uneven or mismatching surface finishes between the two flat faces. Seal 110 may be caused to fail due to mechanical damage during installation, for example, or by changes in material properties or seal cracking due to vibration, temperature gradients and/or long storage times on the shelf prior to installation. Seal 120 may be caused to fail due to a change in material properties (different from those of seal 110) and/or seal cracking. It is to be understood that seal "failure" as used herein may not imply complete failure of the seals, but merely a non-negligible reduction in the sealing performance of the respective seal.

Additionally, in certain embodiments, of the two or three (or more) distinct seals 100, 110 and 120, at least one seal is located on each axial side of a plane 130. Or stated differently, at least two of the three seals 100, 110 and 120 are located on axially opposite sides of the planar interface define by plane 130. The plane 130 is defined at the planar interface between the axial front face 61 of the outer tip 60 (see FIG. 4) on the male joint portion 58 and the axial front face 71 of the inner flange 70 (see FIG. 4) on the female joint portion 56.

The seal 100 is a face-to-face planar contact seal (which may also be called a metal-to-metal contact seal), wherein face to face contact between two planar surfaces occurs. More particularly, this face-to-face contact (or "metal-to-metal" contact) occurs, at plane 130, between the axial front face 61 of the outer tip 60 (see FIG. 4) on the male joint portion 58 and the axial front face 71 of the inner flange 70 (see FIG. 4) on the female joint portion 56. Accordingly, in this embodiment, the face-to-face contact is planar, in that it occurs within a flat plane 130. However, it is to be understood that in alternate embodiments, the abutting surfaces forming this face-to-face contact of the seal 100 may be complementary conical or spherical surfaces. Regardless, the two at least partially axially facing surfaces 61 and 71 therefore abut each other, thereby forming a contact seal between the male joint portion 58 and the female joint portion 56 immediate circumscribing their respective fuel flow passages 59 and 57 which are connected in fluid flow communication.

The second seal 110 is a face seal (or gasket seal) that is formed by the gasket 76, which in this embodiment is disposed within the female joint portion 56, wherein the gasket is axially compressed by the abutting face of the axial front face 61 of the outer tip 60 of the male joint portion 58. As such, the second seal 110 is located radially outward from the first seal 100. As noted above, the gasket 76 includes an axially facing surface 78 (see FIG. 4) that faces toward the axial front face 61 of the outer tip 60 of the male joint portion 58, and is compressed thereby. The gasket 76 is axially compressed, between the axial front face 61 of the male joint portion 58 and the cavity 74 (see FIG. 4) of the female joint portion 56. Accordingly, the gasket 76 has an uncompressed axial dimension that is greater than the axial depth of the cavity 76, such that the gasket is axially compressed when the multi-seal connector 50 is sealed in its closed position as shown. The gasket 76 is therefore axially compressed between the two joint portions while it is held captive (i.e. it cannot move in either an axial or radial direction), therefore forming a face seal for the second seal 110. The face seal provided by the second seal 110 may also permit certain tolerances to be relaxed (e.g. to have a lower tolerance than would normally be required) on key sealing surfaces—including but not limited to the axial front face 61 of the outer tip 60 (see FIG. 4) on the male joint portion 58 and the axial front face 71 of the inner flange 70 (see FIG. 4) on the female joint portion 56. This may be desirable for manufacturing and/or installation of the connector 50.

The third seal 120 is formed by adding a sealant ring 122 (which may be formed, for example, by a paste) within the void 66 defined behind the axial rear face 63 of the outer tip 60 (see FIG. 4) of the male joint portion 58. The sealing ring 122 is a ring of sealant material, such as "caulking", paste or a similar suitable material capable of withstanding the expected environmental temperatures and pressures. The sealing ring 122 is accordingly formed at the junction between the planar axial rear face 63 of the male joint portion 58 and a radially inwardly facing circumferential surface 124 of the outer flange 72 on the female joint portion 56. As such, the sealant ring 122 that forms the third seal 120 is axially spaced apart form the planar interface 130 and is located radially outward of at least the first seal 100. The sealing ring 122 of the third seal 120 may also be considered to be radially outward of a majority of the second seal 110, given that it is located at a radial position that corresponds to a radial most outer edge of the gasket 76 of the second seal 110.

This sealant ring 122 forming the third seal 120 is added to the multi-seal connector 50 during assembly thereof, once the two components 56, 58 have been mated together (but before the locking nut 80 is threaded shut). The sealing ring 122, formed for example of caulking suitable in gas turbine engine applications, may therefore be used to at least partially, or alternately fully, fill the void 66 that is outside the main connection interface at plane 130. The term "outside", in this context, is intended to mean axially and/or radially spaced apart from the main connection interface formed at plane 130, such that the sealing ring 122 can encompass the joint.

In addition to the three seals 100, 110 and 120, the outer locking nut 80 (while not qualified herein or intended to act as a "seal"), may nevertheless also provide a certain amount of additional resistance to any potential fluid loss from the multi-seal connector 50. However, as noted above, the main function of the outer locking nut 80 is to secure the two portions of the multi-seal coupling together, and therefore to maintain the primary seals 100, 110 and 120 in sealing engagement. The outer locking nut 80 also enables the multi-seal connector 50 to be assembled and disassemble (e.g. disconnected) when required. As such the multi-seal connector 50 allows for assembly and disassembly, which may be desirable for maintainability and reparability requirements. All while still providing adequate sealing properties for a hydrogen fuel system in a gas turbine engine.

As will be appreciated given the three different types of seals 100, 110 and 120, these three seals of the multi-seal connector 50 each use a different type of seal and/or form seals between different surfaces, and each has a different failure mode. By providing three distinct seals 100, 110 and 120 within the one connector, redundancies are thus provided should any one of these seals fail.

The embodiments described in this document provide non-limiting examples of possible implementations of the present technology. Upon review of the present disclosure, a person of ordinary skill in the art will recognize that changes may be made to the embodiments described herein without departing from the scope of the present technology. Additionally, various features from the embodiments described hereinabove may be intermixed and combined in any combination, in whole or in part. Yet further modifications could be implemented by a person of ordinary skill in the art in view of the present disclosure, which modifications would be within the scope of the present technology.

The invention claimed is:

1. A multi-seal coupling for fluidly interconnecting a first component and a second component within a hydrogen fuel supply system of a gas turbine engine, the multi-seal coupling comprising:
   a female joint portion adapted to be connected to the first component and a male joint portion adapted to be connected to the second component, the male joint portion received within the female joint portion in mating engagement along a longitudinal axis to form a hydrogen-sealed fuel flow passage through the multi-seal coupling; and
   a first seal, a second seal and a third seal formed between the male joint portion and the female joint portion, the first, second and third seals being hydrogen fuel seals, and wherein:
      the first seal is formed by face-to-face abutting contact between a first axially-facing surface of the male joint portion and an axially-facing surface of the female joint portion;
      the second seal is formed by a gasket axially compressed between the first axially-facing surface of the male joint portion and the female joint portion; and
      the third seal is formed by a sealant ring disposed between a second axially-facing surface of the male joint portion and an adjacent surface of the female joint portion.

2. The multi-seal coupling of claim 1, wherein a planar interface is defined at the first axially-facing surface of the male joint portion, at least the first seal and the second seal defining axial seals at said planar interface.

3. The multi-seal coupling of claim 2, wherein at least two of the first, second and third seals are located on axially opposite sides of the planar interface.

4. The multi-seal coupling of claim 1, wherein the first seal is located radially outward from the hydrogen-sealed fuel flow passage, and the second seal is located radially outward of the first seal.

5. The multi-seal coupling of claim 1, wherein the female joint portion has an outer flange within which an outer tip of the male joint portion is received, the outer tip of the male joint portion having the first axially-facing front face of the first seal.

6. The multi-seal coupling of claim 5, wherein the female joint portion has an inner flange located radially inwardly from the outer flange, the inner flange circumscribing the hydrogen-sealed fuel flow passage and defining the axially-facing surface of the female joint portion.

7. The multi-seal coupling of claim 5, wherein the adjacent surface at the third seal is a radially inwardly facing circumferential surface of the outer flange on the female joint portion.

8. The multi-seal coupling of claim 6, wherein the outer flange is axially offset and radially offset from the inner flange.

9. The multi-seal coupling of claim 6, wherein the gasket of the second seal is radially disposed between the inner flange and the outer flange of the female joint portion.

10. The multi-seal coupling of claim 6, wherein the outer flange of the female joint portion extends axially further towards the male joint portion than does the inner flange of the female joint portion.

11. The multi-seal coupling of claim 1, wherein the gasket of the second seal is received within a cavity defined in the female joint portion radially outward from an inner flange and radially inward of an outer flange, the gasket having an uncompressed axial dimension that is greater than an axial depth of the cavity.

12. The multi-seal coupling of claim 1, wherein the second axially-facing surface of the male joint portion at the third seal faces an axial direction that is opposite that of the first axially-facing surface.

13. The multi-seal coupling of claim 1, wherein the sealant ring of the third seal is axially spaced apart from the first axially-facing surface of the male joint portion.

14. The multi-seal coupling of claim 1, wherein the sealant ring of the third seal is located radially outward of at least the first seal.

15. The multi-seal coupling of claim 14, wherein the sealant ring of the third seal is located radially outward a majority of the gasket of the second seal.

16. The multi-seal coupling of claim 1, further comprising an outer locking nut located radially outward from and surrounding both the male joint portion and the female joint portion, the outer locking nut being threadedly engaged with one of the female joint portion and the male joint portion to generate an axial force towards each other and thereby axially secure the female joint portion and the male joint portion together.

17. A multi-seal coupling for fluidly interconnecting a first component and a second component within a hydrogen fuel supply system of a gas turbine engine, the multi-seal coupling comprising:
   a female joint portion adapted to be connected to the first component, the female joint portion defining a first fuel flow passage therethrough, the female joint portion having an inner flange circumscribing the first fuel flow passage and an outer flange radially spaced apart from the inner flange;
   a male joint portion adapted to be connected to the second component, the male joint portion defining a second fuel flow passage therethrough, the male joint portion received within the female joint portion in mating engagement with the second fuel flow passage in fluid flow communication with the first fuel flow passage, the male joint portion including an outer tip received within the outer flange of the female joint portion, the outer tip having an axially-facing front face;
   a first seal between the male joint portion and the female joint portion, the first seal formed by face-to-face contact at a planar interface between the axial front face of the outer tip on the male joint portion and the inner flange on the female joint portion, the first seal located radially outward from the first and second fuel flow passages;

a second seal between the male joint portion and the female joint portion, the second seal forming a face seal and including a gasket, the gasket being axially compressed between the axial front face of the outer tip on the male joint portion and the female joint portion at said planar interface, the second seal being located radially outward of the first seal; and a third seal between the male joint portion and the female joint portion, the third seal including a sealant ring that is axially spaced apart form the planar interface and located radially outward of at least the first seal, the third seal being disposed between an axial rear face of the outer tip of the male joint portion and a radially inwardly facing circumferential surface of the outer flange on the female joint portion.

18. A gas turbine engine at least partially powered by hydrogen fuel, the gas turbine engine comprising:

a compressor, a combustor and a turbine;

a hydrogen fuel supply system, comprising:

an external fuel manifold disposed outside a casing surrounding the annular combustor and being fastened thereto;

fuel nozzles circumferentially distributed about the combustor for injecting the hydrogen fuel therein, radially outer ends of the fuel nozzles being fastened to the casing and axially spaced apart from the external fuel manifold;

fuel supply tubes disposed outside the casing and fluidly interconnecting the radially outer ends of the fuel nozzles and the fuel manifold; and multi-seal couplings fluidly interconnecting the fuel supply tubes with one or both of the fuel manifold and the fuel nozzles, the multi-seal couplings including:

a female joint portion adapted to be connected to the first component and a male joint portion adapted to be connected to the second component, the male joint portion received within the female joint portion in mating engagement along a longitudinal axis to form a hydrogen-sealed fuel flow passage through the multi-seal coupling; and a first seal, a second seal and a third seal formed between the male joint portion and the female joint portion, the first, second and third seals being hydrogen fuel seals, and wherein:

the first seal is formed by face-to-face abutting contact between a first axially-facing surface of the male joint portion and an axially-facing surface of the female joint portion;

the second seal is formed by a gasket axially compressed between the first axially-facing surface of the male joint portion and the female joint portion; and the third seal is formed by a sealant ring disposed between a second axially-facing surface of the male joint portion and an adjacent surface of the female joint portion.

19. The gas turbine engine of claim 18, wherein a planar interface is defined at the first axially-facing surface of the male joint portion, at least the first seal and the second seal defining axial seals at said planar interface.

20. The gas turbine engine of claim 19, wherein at least two of the first, second and third seals are located on axially opposite sides of the planar interface.

* * * * *